United States Patent
Tritchew et al.

[19]

[11] Patent Number: 5,897,223
[45] Date of Patent: Apr. 27, 1999

[54] STABILIZED PLATFORM SYSTEM FOR CAMERA

[75] Inventors: Steven Tritchew, Richmond Hill; Raigo Alas, Guelph; Michael D. Lewis, Burlington, all of Canada

[73] Assignee: Wescam Inc., Flamborough, Canada

[21] Appl. No.: 08/971,617

[22] Filed: Nov. 17, 1997

[51] Int. Cl.⁶ .................................................. G03B 39/00
[52] U.S. Cl. ............................................. 396/13; 348/144
[58] Field of Search .................................. 396/7, 12, 13, 396/419, 428; 348/144–147

[56] References Cited

U.S. PATENT DOCUMENTS 4,498,038  2/1985  Malueg .
4,989,466  2/1991  Goodman .
5,191,370  3/1993  Bozzolato .

FOREIGN PATENT DOCUMENTS 904616  7/1972  Canada .

Primary Examiner—Howard B. Blankenship
Attorney, Agent, or Firm—Rogers & Scott

[57] ABSTRACT

A stabilized platform system for isolating a payload from angular motion and translational and angular vibration of a supporting structure, has an inner gimbal for carrying the payload, a sprung shell containing and carrying the inner gimbal in a manner permitting the inner gimbal a limited amount of angular movement relative thereto about pitch, roll and yaw axes, and an outer gimbal containing the sprung shell and inner gimbal. A passive vibration isolator is connected between the sprung shell and the outer gimbal and has two symmetrical arrays of dampened coil springs located on opposite sides of the sprung shell.

11 Claims, 11 Drawing Sheets

FIG. 4a"

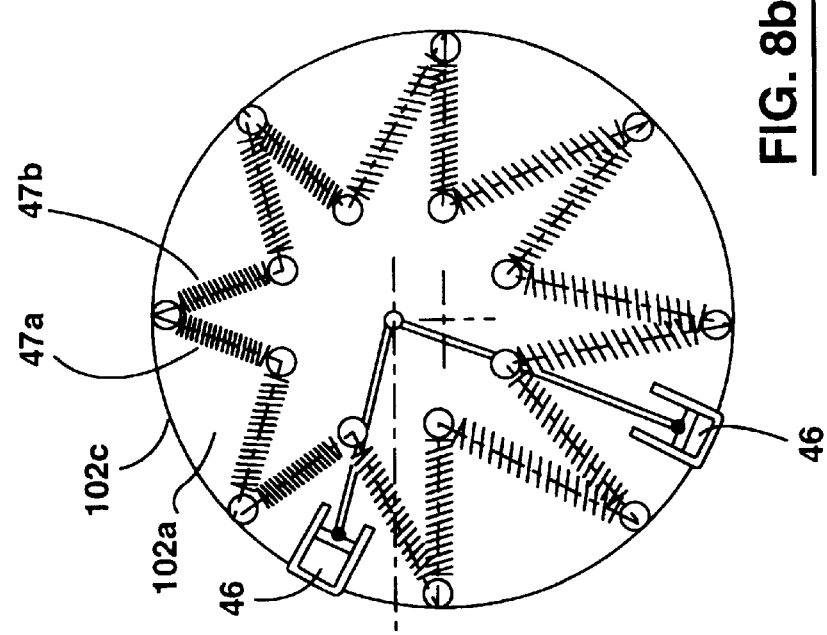
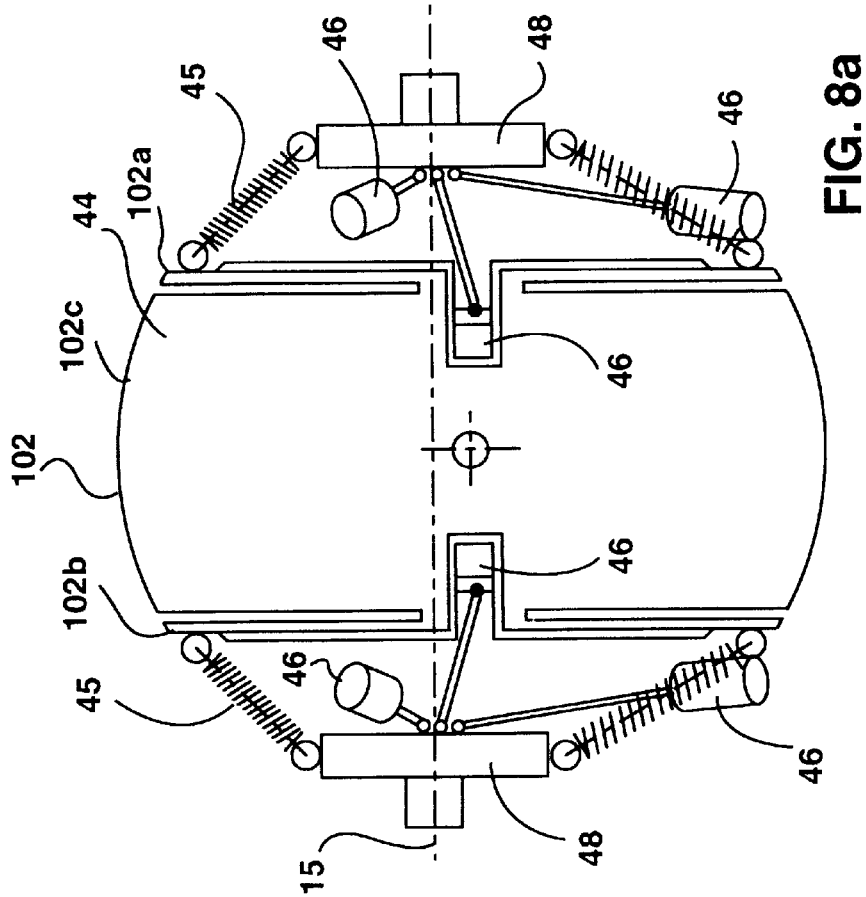

STABILIZED PLATFORM SYSTEM FOR CAMERA

FIELD OF THE INVENTION

This invention relates to stabilized platform systems for isolating a payload from angular motion and translational and angular vibration of a supporting structure.

BACKGROUND OF THE INVENTION

When it is desired to operate imaging devices such as cameras or infra-red imaging systems on moving vehicles such as aircraft, automobiles or boats, it is usually necessary for the imaging device itself to be stabilized in some manner. For example, U.S. Pat No. 3,638,502 (Leavitt et al) issued Feb. 1972 describes a stabilized camera mount in which the camera is supported from a universal joint centrally located in a spherical protective fairing, the universal joint in turn being supported by a compliant vibration isolator. A set of three orthogonal gyroscopes is attached to the camera platform, and the reaction forces from the gyroscopes tend to stabilize the platform directly. Additionally, angle transducers on the precession axes of the gyroscopes are used to sense angular rates and to automatically apply correcting moments to the platform using a combination of moving weight servos and magnetic torque motors as in the above-mentioned patent, or by means of three magnetic torque motors driving the three axes of the universal joint as in U.S. Pat. No. 4,989,466 (Goodman) issued Feb. 5, 1991. In each case, the various axes of the universal joint are used to constrain motion, so that conventional magnetic torque motors can be used. These must be mounted on the structures of the universal joint and occupy a substantial volume at the centre of the assembly which could be better used to house the payload, i.e. the imaging device.

In such prior art, the structure of the stabilized platform must be relieved in areas where it can otherwise interfere with the structure supporting the compliant vibration isolator and universal joint, thus resulting in loss of further possible payload space. Even with this loss of space, the manoeuvrability of the supporting vehicle is invariably restricted when carrying such prior art assembly.

Another problem arises with such prior art. If it is necessary, for example with an aircraft installation, to fly over an object on the ground and at the same time to track the object with a camera, the elevation over azimuth steering geometry of such prior art may prevent the operator from achieving this due to a phenomenon known as gimbal lock.

SUMMARY OF THE INVENTION

According to the present invention, a stabilized platform system for isolating a payload from angular motion and translational vibration of a supporting structure has an inner gimbal for carrying the payload, a sprung shell containing and carrying the inner gimbal in a manner permitting the inner gimbal a limited amount of angular movement relative thereto about pitch, roll and yaw axes, an outer gimbal containing the sprung shell and inner gimbal, and a passive vibration isolator connected between the sprung shell and the outer gimbal and having two symmetrical arrays of dampened coil springs located on opposite sides of the sprung shell.

The stabilized platform system may have an array of at least three magnetic torque motors, each motor having an electrically energizable coil portion carried by the sprung shell and a magnetic structure portion carried by the inner gimbal, each magnetic torque motor having an active axis along which an inner gimbal positioning force can be applied but having freedom of movement about the other two axes, and a controller for controlling energization of the motors to apply controlled moments to the inner gimbal about any axis of rotation.

The stabilized platform may also have at least one capacitive angle sensor having a first portion carried by the sprung shell and a second portion carried by the inner gimbal with an air gap between said first and second portions, said capacitive angle sensor being responsive to relative motion between the first and second portions.

Each array of dampened coil springs of the passive vibration isolator preferably extends completely around the sprung shell on the respective side thereof to provide compliance in three orthogonal directions. Eccentric mechanism connecting the passive vibration isolator to the outer gimbal and responsive to angular movement of the outer gimbal may be provided to position the sprung shell at an optimum location in the outer gimbal by correcting static displacement of the isolator.

The inner gimbal may carry at least one fiber optic gyro operable to provide a signal of angular movement of the inner gimbal about a pre-determined axis.

The stabilized platform system may have a first mounting member carrying the outer gimbal, the outer gimbal being angularly adjustable relative to the first mounting member about an elevation axis. A second mounting member may carry the first mounting member, the first mounting member being angularly adjustable relative to the second mounting member about a horizontal axis perpendicular to the elevation axis. The second mounting member may itself be angularly adjustable about a vertical axis.

Alternatively, the stabilized platform system may have a mounting member carrying the outer gimbal, the outer gimbal being angularly adjustable relative to the mounting member about an elevation axis, the mounting member itself being angularly adjustable about a vertical axis.

BRIEF DESCRIPTION OF THE DRAWINGS

Embodiments of the invention will now be described, by way of example, with reference to the accompanying drawings, in which:

FIGS. 8a and 8b show the principal components of the vibration isolator of FIGS. 4a' and 4a'' used with a modified sprung shell.

DESCRIPTION OF PREFERRED EMBODIMENTS

Figure 1A:
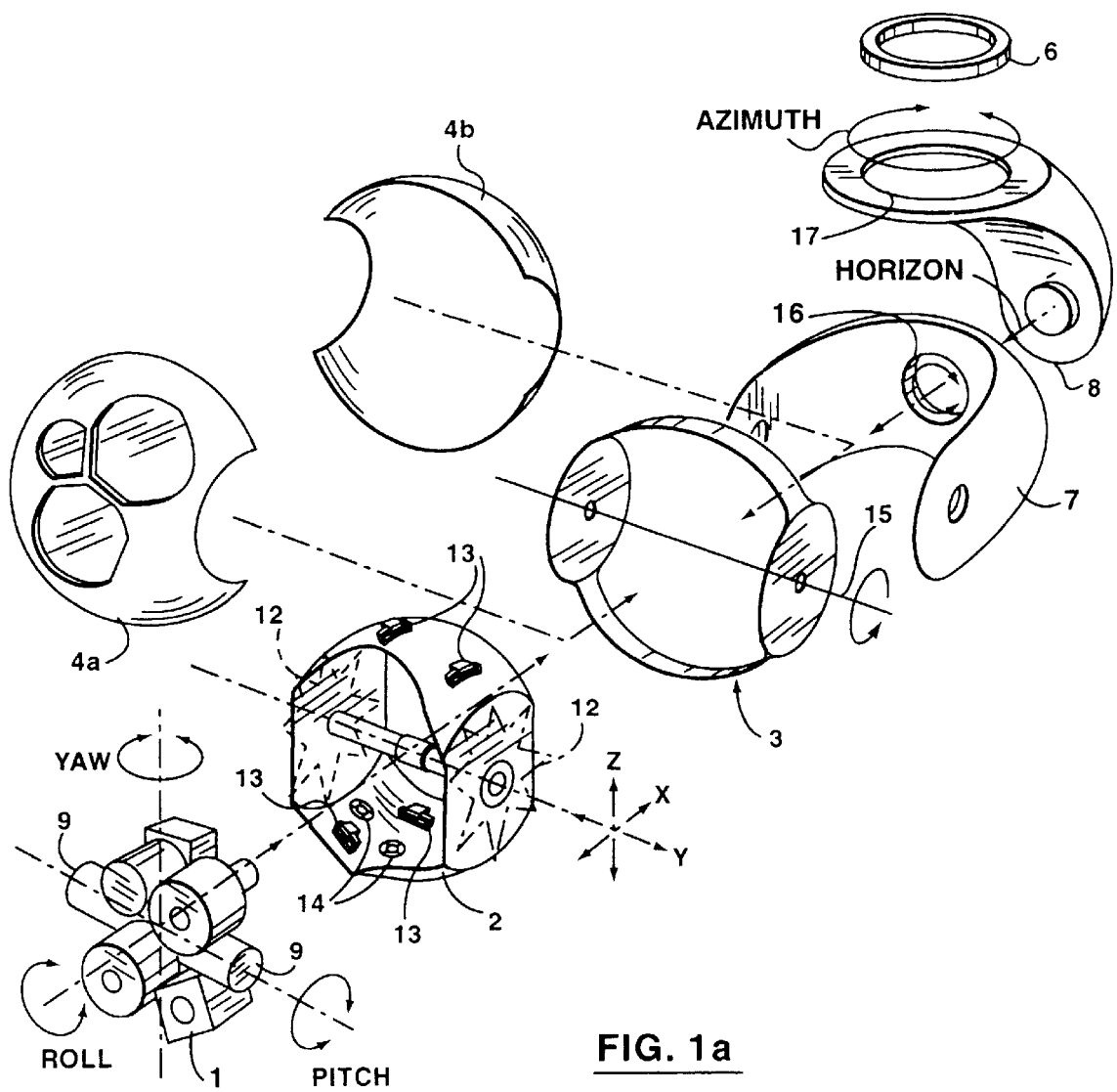
FIG. 1a is an exploded perspective view of a stabilized platform system in accordance with one embodiment of the invention with three outer axes of rotation and showing it's principal components.

Referring to the drawings, a stabilized platform system with three outer axes of rotation is shown in FIG. 1a and has an inner gimbal 1 which consists of a single rigid structure comprising the payload, i.e. the imaging device, and various position and motion sensors and actuators. The payload typically has an array of one or more sensors bore-sighted to a master sensor. The various position and motion sensors and actuators which are part of the inner gimbal 1 will be described in detail with reference to FIG. 5 in due course. The inner gimbal 1 is generally spherical and has a central horizontal cylindrical passage 9.

The inner gimbal 1 fits into a light hollow shell 2, hereinafter referred to as a sprung shell. A cylindrical bar 10, which is part of the sprung shell, passes through the cylindrical passage 9 and supports the inner gimbal 1 on a central pivot 11. The pivot 11 allows the inner gimbal 1 to move freely about three orthogonal axes, namely pitch, roll and yaw, through small angles, typically less than plus or minus five degrees. The cylindrical passage 9 is appropriately sized to permit such angular movement, i.e. without the inner gimbal 1 contacting the bar 10. Likewise, the outer perimeter of the inner gimbal 1 is shaped to clear adjacent parts of the sprung shell 2. The weight of the inner gimbal 1 is precisely and neutrally balanced (about all three orthogonal axes) about the central pivot 11, in a manner which will be described in more detail later.

The inner gimbal and sprung shell combination 1, 2 is supported by two symmetrical arrays of extension coil springs and fluid dash pots 12 which form a passive vibration isolator, and which will be described more fully later with reference to FIGS. 4a, 4b and 4c. The vibration isolator 12 is in turn supported from a ring structure 3 which forms an outer gimbal and which is part of an environmental enclosure for the inner gimbal 1. The inner gimbal 1 is torqued against the sprung shell 2 by an array of three or more magnetic torque motors 13. The construction and principle of operation of the torque motors 13 will be described more fully later with reference to FIGS. 2a and 2b.

The limited angular displacements of the inner gimbal 1 relative to the sprung shell 2 are measured by an array of capacitive angle sensors 14, the construction and principle of which will be described more fully later with reference to FIG. 3.

The above-mentioned environmental enclosure comprises the outer gimbal ring 3 and hemispherical front and rear covers 4a and 4b. In addition to mechanical fasteners, the attachments of the covers 4a, 4b to the outer gimbal 3 contain both weather seals and EMI seals (not shown) to protect the inner gimbal 1 from the environment. The front cover 4a has an array of windows aligned with the array of sensors mounted on the inner gimbal 1, each sensor having a window of a material which is transparent in the spectral band of the corresponding sensor and of a quality which does not adversely affect the quality of the image obtained from the sensor.

In this embodiment of the invention, which has three outer axes of rotation, the environmental enclosure is supported on a horizontal yoke 7. The yoke 7 contains bearings and a servo actuator which can rotate the environmental enclosure and its contents about an elevation axis 15. The servo actuator will be described more fully later with reference to FIG. 6. The angle of elevation rotation is limited only by wind-up of electrical cables which are used to connect the inner gimbal 1 with the supporting structure. If required, these cables may be passed through electrical slip-rings connected to axis 15 to provide unlimited rotation about this axis.

The horizontal yoke 7 is in turn mounted in a cantilevered fashion from a bearing 16 also equipped with a servo actuator (to be described more fully with reference to FIG. 6) to enable the yoke to be rotated about a horizontal axis limited only by the wind-up of electrical cables. Again, if required, the cables may be passed through electrical slip-rings attached to this axis to provide unlimited rotation about this axis.

The horizontal yoke 7 is supported by means of the bearing 16 from a cantilevered carrier 8, which in turn is supported by a bearing 17 for movement about a vertical azimuth axis. This axis of rotation is also equipped with a servo actuator to be described more fully later with reference to FIG. 6. The bearing 17 is mounted on a fixture 6, which is a part of the supporting structure. Again the angle of rotation about this axis is limited by the wind-up of electrical cables but, as before, this axis may be equipped with electrical slip-rings to provide unlimited rotation in either direction.

Figure 1B:
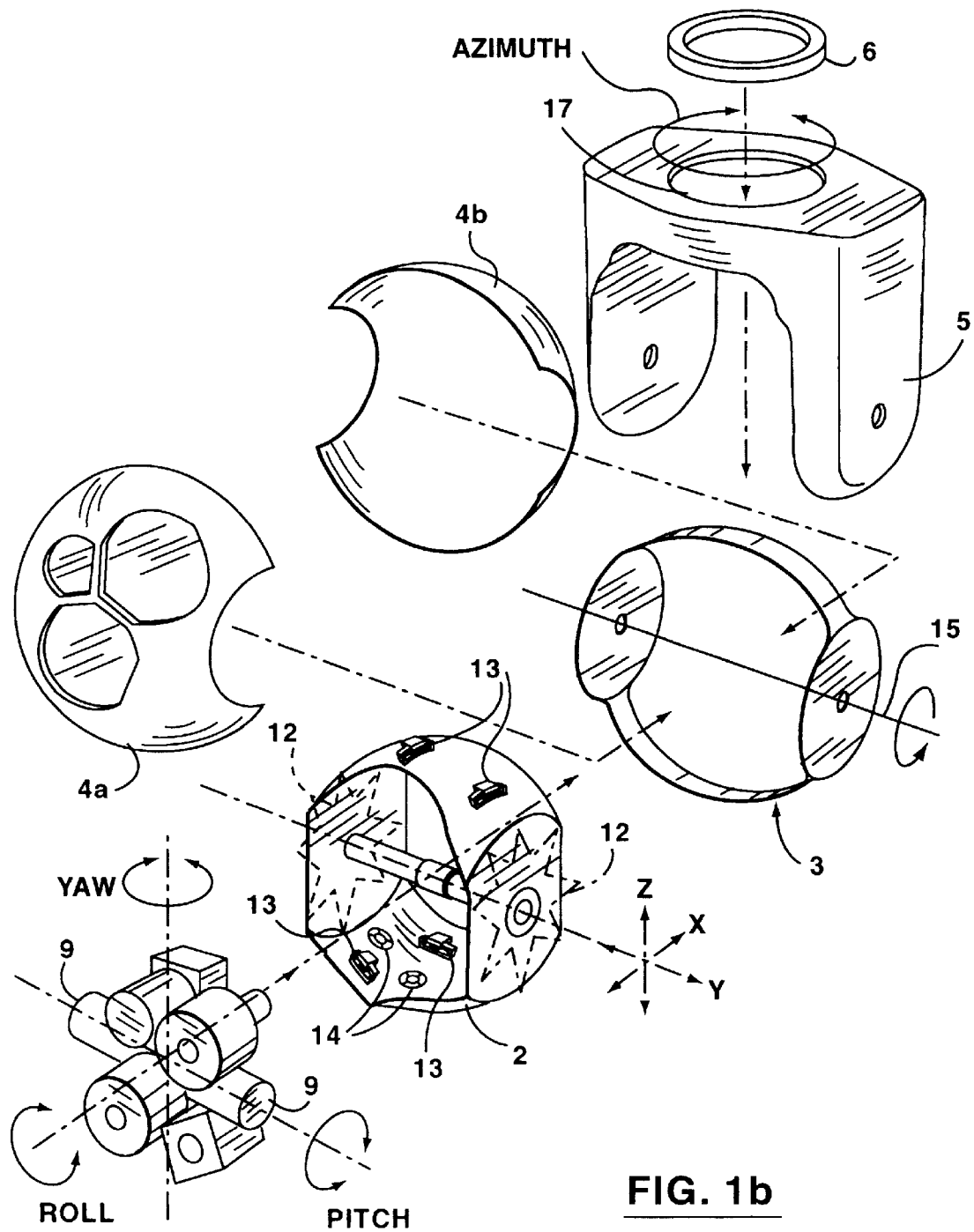
FIG. 1b is a similar view of another embodiment of the invention having two outer axes of rotation.

A stabilized platform system with two outer axes is shown in FIG. 1b, which is similar to FIG. 1a except that the environmental enclosure 4a, 4b and its contents are supported by a vertical yoke 5 instead of the horizontal yoke 7 as in FIG. 1a. The vertical yoke 5 is supported directly by fixture 6 through bearing 17 and its servo actuator.

Figure 2A:
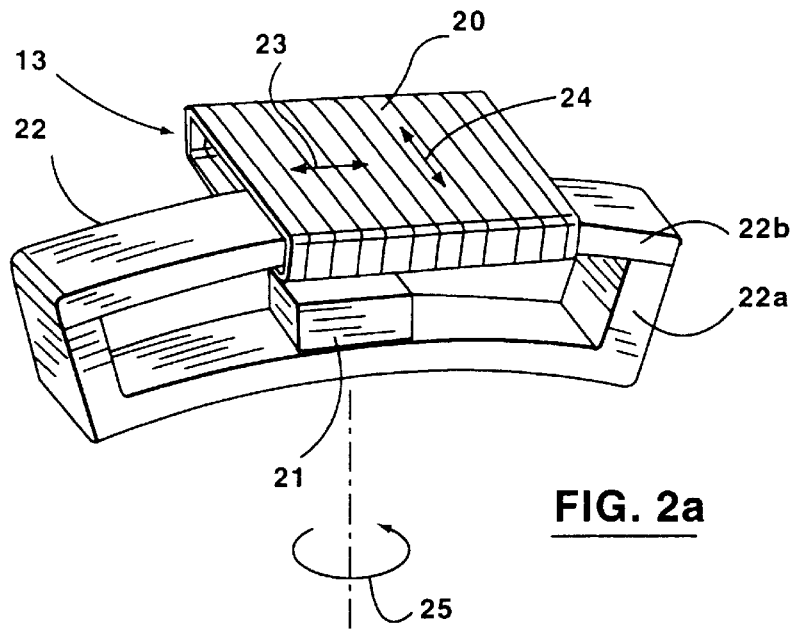
FIG. 2a is a perspective view of a magnetic torque motor used in the platform systems of FIGS. 1 and 2.

FIG. 2a is a perspective view of one of the magnetic torque motors 13 shown in FIGS. 1a and 1b. A rectangular coil 20 is made by winding wire around a rectangular form (not shown) and potting with a suitable compound. The form is then removed to leave a rigid coil. The coil 20 is attached to the sprung shell 2 shown in FIGS. 1a and 1b. The other part of the motor 13 is carried by the inner gimbal 1 and comprises a rare earth magnet 21 and a magnetic structure 22 of soft but high magnetic permeability material. The structure 22 has two parts 22a, 22b to enable the motor coil 20 to be mounted on magnetic structure 22 before being attached to each other in any suitable manner. The purpose of magnetic structure 22 is to direct the magnetic field away from the upper surface of the coil 20.

When an electric current is passed through the coil 20, the magnetic field passing through the bottom surface thereof generates a magnetic force in the direction indicated by the arrow 23 normal to the direction of the winding. The magnetic structure 22 is shaped such that the coil 20 is free to move relative to the structure 22 not only in the direction of the arrow 23 but also in the orthogonal direction indicated by the arrow 24 and about the axis 25 of the magnet 21. The magnetic structure 22 is curved and shaped to allow it to rotate in the direction mentioned through limited angles about the central pivot 11 in FIGS. 1a, 1b without touching the coil 20.

Figure 2B:
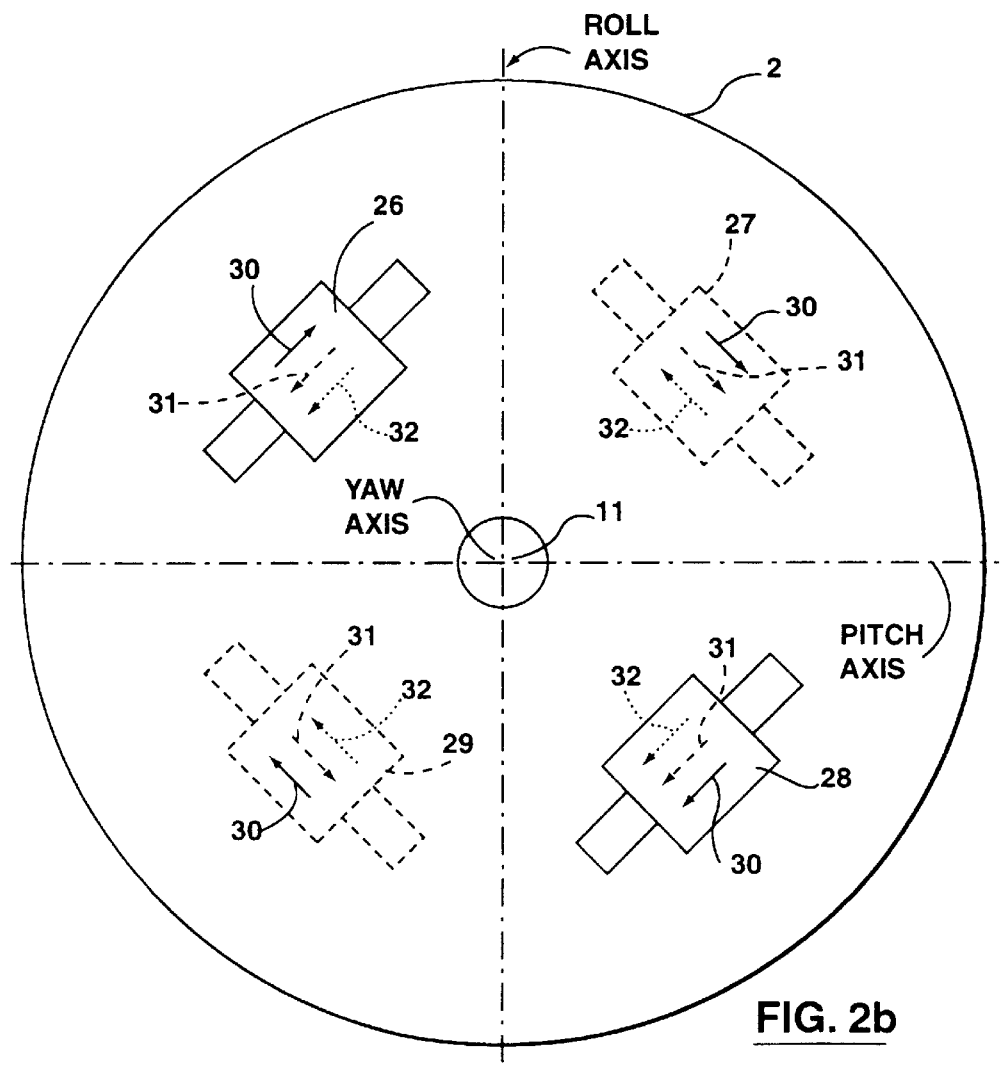
FIG. 2b is a plan view of a preferred arrangement of the torque motors in an array.

FIG. 2b shows a plan view of a preferred array of torque motors 13 (in this embodiment an array of four) which can in concert exert moments of force on the inner gimbal 1 about any of three orthogonal axes. Two motors 26, 28 (shown in solid outline) are secured to the roof of the sprung shell 2, and two motors 27, 29 (shown in broken outline) are secured to the floor thereof. If it is desired to exert a moment of force about the yaw axis, then the coils 20 of all four motors are energized to create equal forces in the directions indicated by the arrows 30. Moments created by these forces combine to create a moment about the yaw axis which is proportional to the magnitudes of the currents, but cancel so that no moments result about the roll or pitch axes. If it is desired to exert a moment of force about the roll axis, then the coils 20 of the motors are energized to create equal forces in the directions indicated by the arrows 31. Moments created by these forces combine to create a moment about the roll axis which is proportional to the magnitudes of the coil currents, but cancel so no moments result about the yaw or pitch axes.

Similarly, if it is desired to exert a moment of force about the pitch axis, then the coils 20 of the motors are energized to create equal forces in the directions indicated by the arrows 32. Moments created by these forces combine to create a moment about the pitch axis which is proportional to the magnitudes of the coil currents, but cancel so no moments result about the roll or yaw axis. If it is desired to exert moments about all three axes simultaneously, then the first three sets of coil currents for directions 30, 31, 32 must first be scaled (in both magnitude and direction) to produce the desired moment about each axis, then summed for each coil and applied simultaneously.

Figure 3A:
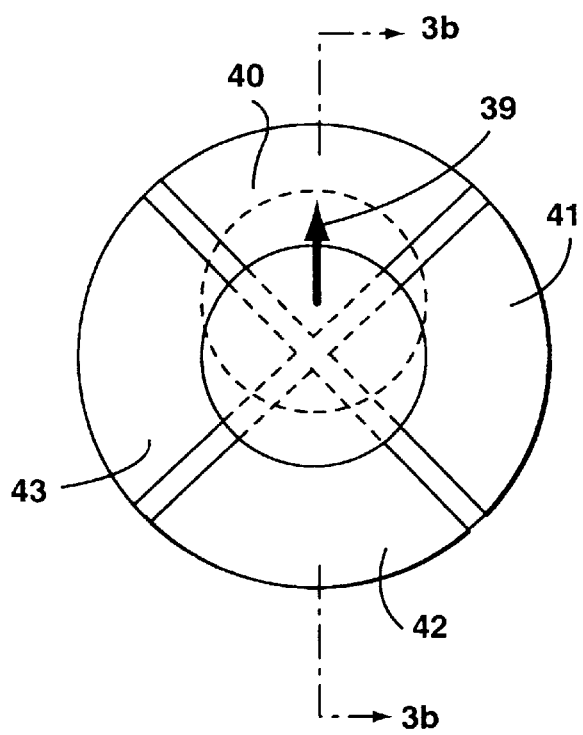
FIGS. 3a and 3b illustrate the principle of operation of capacitive angle sensors, FIG. 3b being a sectional view taken along the line 3b—3b' of FIG. 3a, FIGS. 4a' and 4a" show the principal components of the vibration isolator, FIG. 4a' being a front view and FIG. 4a" being a side view.
Figure 3B:
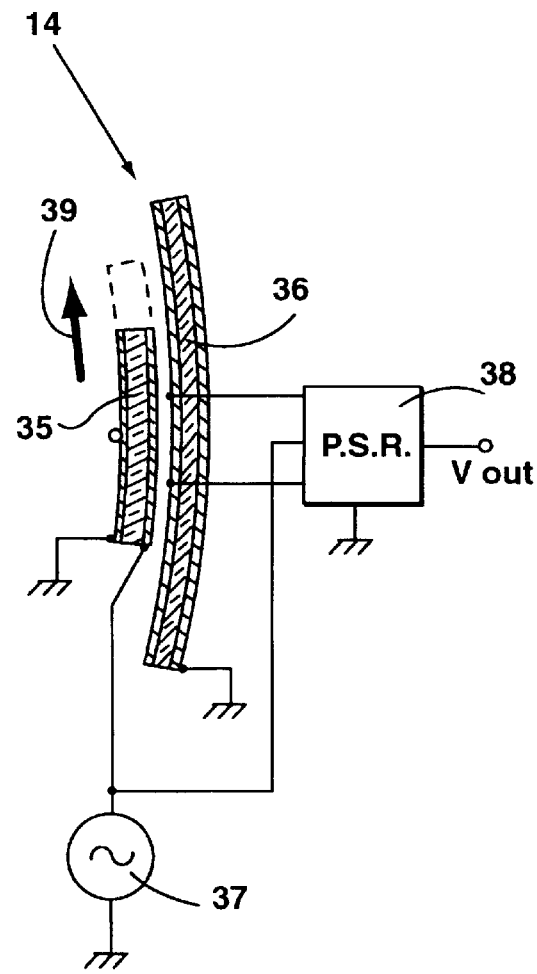

FIG. 3 illustrates the principle of operation of the capacitive angle sensors 14 shown in FIGS. 1a and 1b. An array of two sensors is used to measure the three small angles about the three orthogonal axes through which the inner gimbal 1 is free to rotate relative to the sprung shell 2. Each sensor 14 has two disks 35, 36 of dielectric material coated on both surfaces with a conductive film. Each disk 35, 36 is formed as a section of a sphere (rather than as a planar disk), the radius of each sphere corresponding to the distance of the location of the disk from the central pivot. Each disk 35, 36 is mounted so that each spherical surface is concentric with the pivot point.

Each sensor 14 of the array has a similar excitation disk 35 and a larger sensing disk 36. In the larger sensing disk 36, the conductive film on the concave surface is divided into four equal quadrants 40, 41, 42, 43, each separated by a band of dielectric. The excitation disk 35 is attached to the inner gimbal structure 1, and the sensing disk 36 is attached to the sprung shell 2. The two disks, 35, 36 are separated by a small air gap. The convex surface of the excitation disk 35 and each quadrant 40, 41, 42, 43 of the sensing disk 36 form capacitors of variable value. The four quadrants 40, 41, 42, 43 also form four capacitors of fixed value through the dielectric with the convex conductive surface of the sensing disk 36.

An electronic oscillator 37 is used to apply a sinusoidal excitation voltage between the excitation disk 35 and the two outer grounded conductive surfaces. The four variable capacitors and the four fixed capacitors are connected as two capacitive bridge circuits. The output of each bridge circuit is conditioned by a phase sensitive rectifier (PSR) circuit 38 which converts the magnitude and direction of a bridge unbalance into a direct current voltage whose magnitude is proportional to the amount of unbalance and whose polarity reflects the direction of unbalance. When the excitation disk 35 is located centrally over the sensing disk 36, both bridge circuits are balanced and both PSR circuits 38 have a zero volt output.

When the excitation disk 35 is moved from the central location in the direction of the arrow 39, the resultant capacitants change causes the bridge formed by quadrants 40, 42 to be gradually unbalanced and its associated PSR circuit 38 produces an output voltage proportional to the angle of offset. The other bridge formed by quadrants 41, 43 remains in balance and its associated PSR circuit (not shown) continues to have a zero volt output. Similarly, if the excitation disk 35 is offset from the central location in a direction at right-angles to the arrow 39, the second PSR circuit 38 produces an appropriate output voltage while the first PSR circuit 38 continues to have a zero voltage output.

If the excitation disk 35 is offset in an oblique direction, the outputs of the two PSR circuits 38 resolve the resulting displacement into two components, namely parallel and at right angles to the arrow 39. Since it is necessary to measure all three orthogonal angular displacements, an array of two capacitive sensors 14, separated by a known angle, is required as shown in FIGS. 1a and 1b. Two of the three angles are obtained by summing the outputs of the two sensors 14 of the array. The third angle, which represents rotation about the mid-point of the line joining the two capacitive sensors 14, is obtained by taking the difference of displacements in the direction normal to the line joining the two sensors 14 of the array.

Figure 4A:
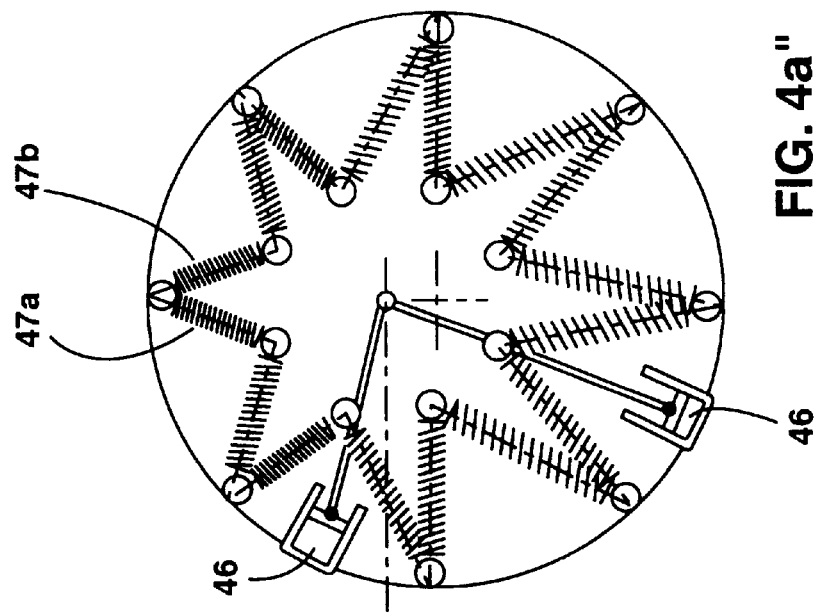
FIGS. 4b and 4c show the mechanism for compensating for static displacement of the vibration isolator.
Figure 4A:
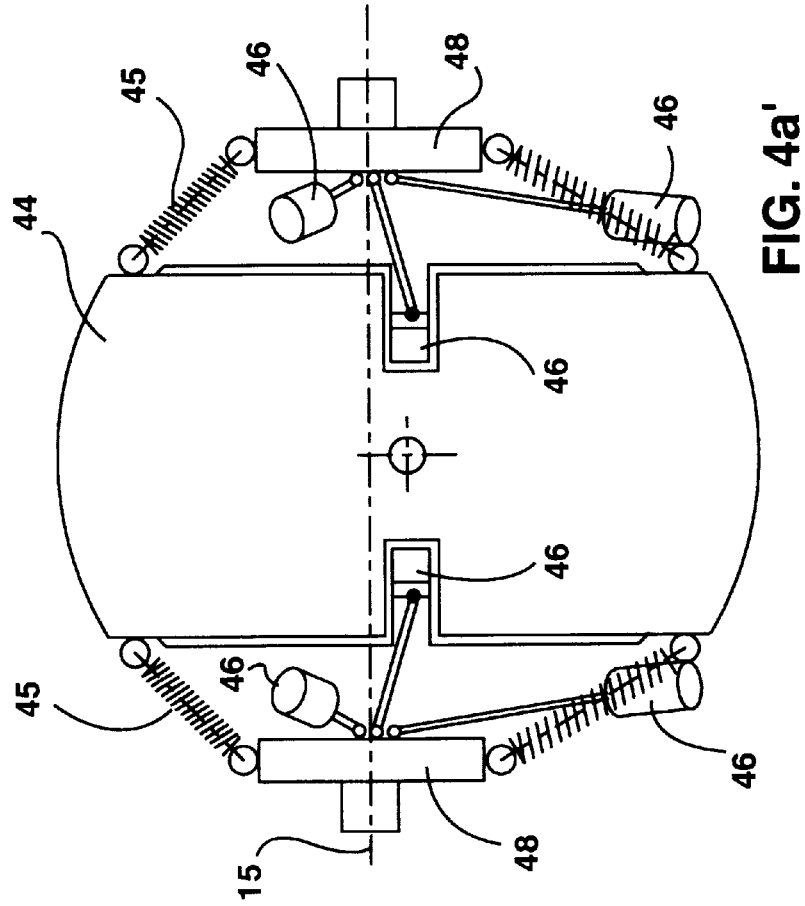

FIG. 4a shows the principal components of the passive vibration isolator. The mass 44 suspended from the isolator is the combination of the inner gimbal 1 and the sprung shell 2. The mass 44 is supported by two conical arrays of extension springs 45 which in turn are supported by two disks 48 carried by the outer gimbal 3. The springs 45 are oriented so that the resulting spring constants of the array are equal in the three orthogonal directions x, y and z defined in FIGS. 1a and 1b, and thereby have equal natural frequencies in the three directions. Also, the form factor and material of the coil springs 45 and the array are chosen so that the numeric value of the natural frequency for a given value of mass 44 can be pre-selected. Furthermore, the springs 45 on each side of the mass 44 are arranged in a conic form as shown, with each cone conforming approximately to the spherical form of the environmental enclosure.

Additionally, the springs 45 are arranged in angled pairs, such as 47a, 47b to provide a firm resistance to the moments applied by the motor array 13 shown in FIGS. 1a, 1b about the pitch axis. Also, the arrays of springs 45 are arranged to be symmetrical about the elevation axis 15 in FIGS. 1a, 1b and FIG. 4a' so that the characteristics of the array do not vary with varying attitude as the outer gimbal 3 is rotated about the elevation axis. The amplitude of oscillation at resonance of the isolator is controlled by an array of at least six fluid dashpots 46 attached to the sprung shell 2, with two dashpots 46 acting in each orthogonal direction. The dashpot fluid may be a liquid or a gas. The piston of each dashpot 46 is coupled to the respective disk 48 by a rod having a ball joint at each end, permitting the isolator to displace in all three orthogonal directions simultaneously without binding the dashpots 46.

It is a well known property of passive vibration isolators that a supported mass tends to sag or displace statically when it is supported by springs. This sag is shown in an exaggerated manner in FIG. 4a'. Also, the magnitude of such static displacement is related to the natural frequency of the isolator, but is independent of the magnitude of the suspended mass. The relationship is given by the equation:

$F = (g/d)/2\pi$ where 'F' is the natural frequency in hertz, and 'g' and 'd' are the acceleration due to gravity and the static displacement in any consistent set of units.

It can be determined from this relationship that, as the static displacement increases, the natural frequency decreases. A low natural frequency is desirable. However, a large static displacement is undesirable since physical clearance must be provided between the sprung shell 2 and the environmental enclosure 3, 4a, 4b for all elevation attitudes, and the environmental enclosure would therefore be undesirably large compared to the size of the sprung shell 2.

It is also a well known phenomenon that, when hardened steel springs are used to suspend a mass to form a vibration isolator, each spring exhibits many resonance modes of its own, both longitudinal and lateral, due to the mass and compliance of its coils. One or more of these many resonances may be excited by the vibration spectrum of a vehicle to which a stabilized platform system is attached. With hardened springs, the factor of amplification at resonance 'Q' can be very high (of the order of 100). One or more of such resonance conditions may result in the repeated overstressing of the spring material and cause premature failure from fatigue.

Each spring 45 is therefore damped so as to significantly reduce the 'Q' factor at resonance. This is achieved by adding friction damping to each spring. The friction damping is supplied by a length of braided rope of a suitable material and having an outside diameter larger than the inside diameter of the spring. This length of rope is forcibly pulled through the spring and cut to the length of the fully extended spring. The pressure resulting from the interference fit applies a radial force to the inner diameter of the spring. Small cyclic changes in the length of the spring result in friction between the spring and rope which reduces the 'Q' factor of all spring resonances and prolongs fatigue life. This friction is also effective at the resonance frequencies of the vibration isolator and augments the action of the dashpot dampers 46.

Figure 4B:
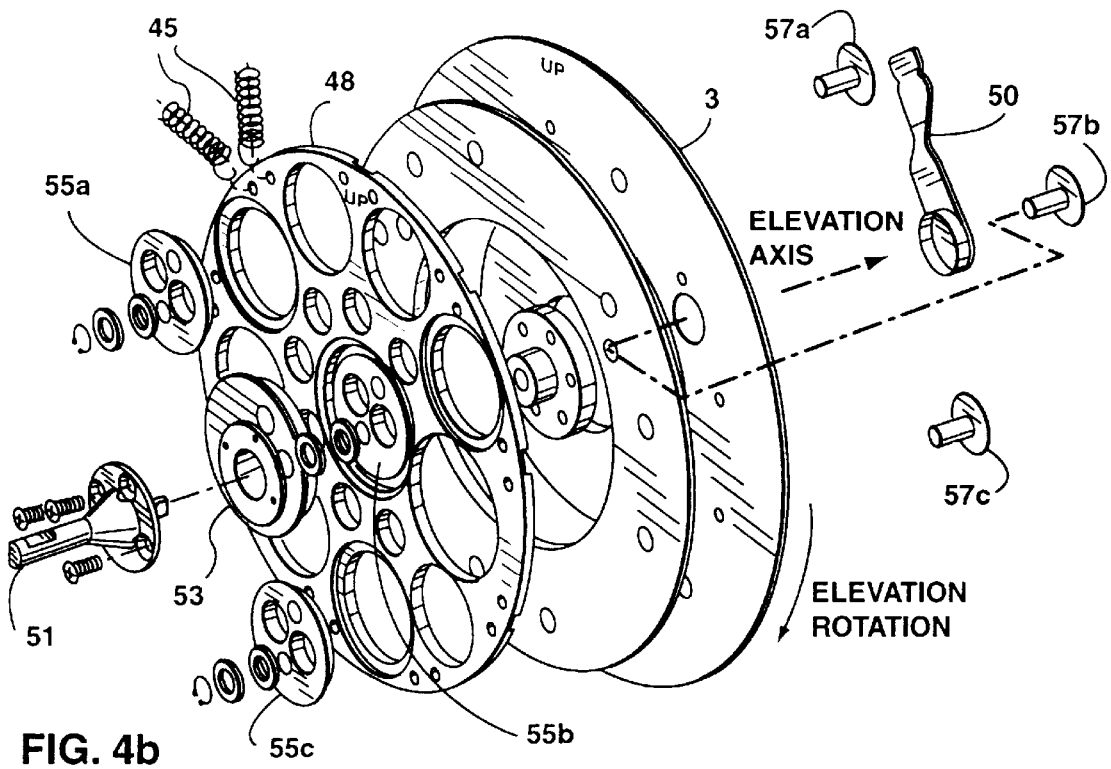
Figure 4C:
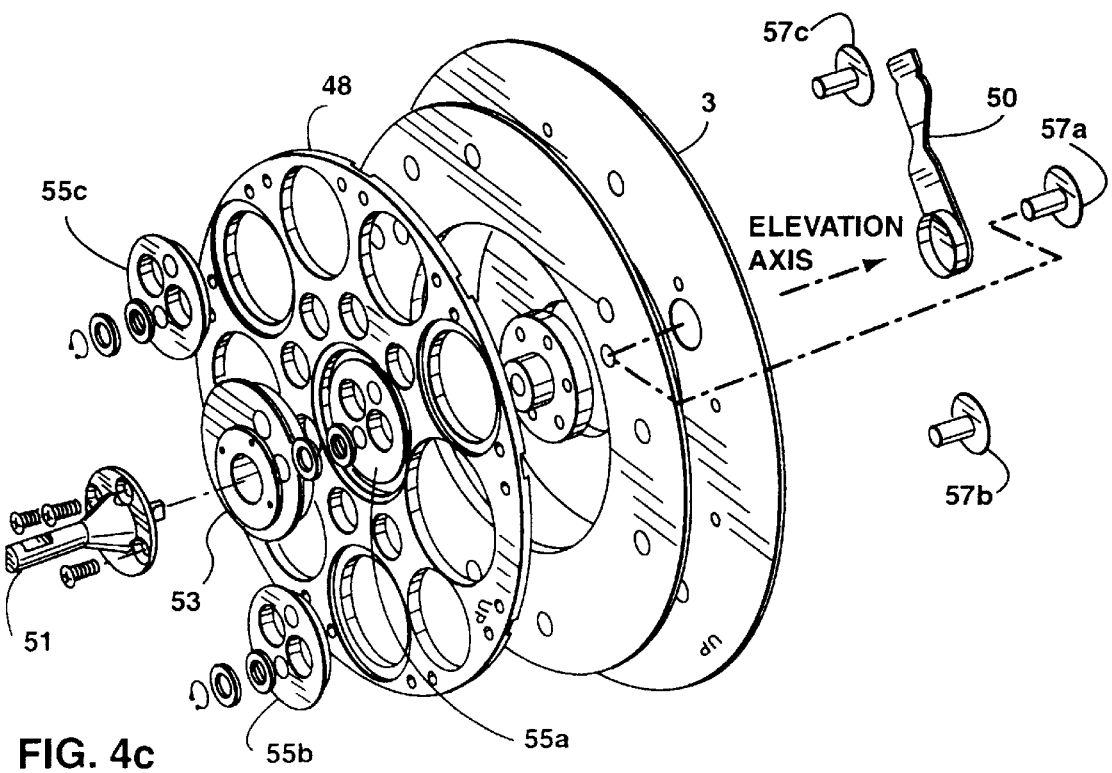

FIGS. 4b and 4c show a mechanism which is used to raise the suspended mass by a displacement approximately equal to the static displacement so that the sprung shell 2 remains centred in the environmental enclosure 3, 4a, 4b for the full range of elevation angles. FIGS. 4b and 4c are two different views of the same mechanism, corresponding to two different elevation angles separated by about 120 degrees of rotation. Two of the mechanisms shown in FIGS. 4b and 4c are used, one on each side of the suspended mass. The mechanism located on the opposite side is a mirror image of the mechanism shown in the figures.

With reference to FIG. 4b, a vertical support member 50 is an integral part of the horizontal yoke structure 7 or of the vertical yoke structure 5 of FIGS. 1a and 1b respectively. A shaft 51 is rigidly attached to the member 50. The shafts 51 (and a large ball bearing attached to the rear face of outer gimbal 3 and hence not visible in the drawing) support the outer gimbal ring 3, allowing the gimbal ring to rotate about the elevation axis. An eccentric member 53 having an external bearing surface 52 is attached to the shaft 51. The amount of eccentricity of member 53 is made equal to the static displacement of the spring isolator, and is generally in the upward direction, opposite to the static displacement. The external bearing surface 52 of eccentric member 53 supports the centre of the isolator spring support disk 48 in FIG. 4, allowing it to rotate freely about the bearing axis. Three other shafts 57a, 57b, 57c are rigidly attached to the outer gimbal 3 and are parallel to and disposed in a circle about the first shaft 51. These shafts each support an eccentric member 55a, 55b, 55c having both inner and outer bearing surfaces and having the same eccentricity as eccentric member 53. The outer bearing surfaces of eccentric members 55a, 55b, 55c also support the spring support disk 48 and constrain its free rotation about the bearing surface 52.

When the environmental enclosure is driven by the elevation actuator through any angle including 120 degrees as shown in FIG. 4c, the isolator spring support disk 48 is also caused to rotate by shafts 57a, 57b, 57c and eccentric members 55a, 55b and 55c as shown. However, the centre of the isolator support disk 48 remains elevated by the amount of the eccentricity of member 53. A problem arises when the number of outer eccentric members 55 is less than 2. When the two eccentric members 53 and 55c for example are aligned as shown in FIG. 4c, the two eccentric members may tend to rotate in opposite directions, causing their outer eccentric bearing surfaces to bind in disk 48. To resolve the uncertainty in the direction of rotation in this alignment, the other two eccentric members 55a, 55b are not aligned with eccentric member 53 when eccentric members 55c and 53 are aligned, and constrain the direction of rotation at this point so as to prevent binding.

Figure 5:
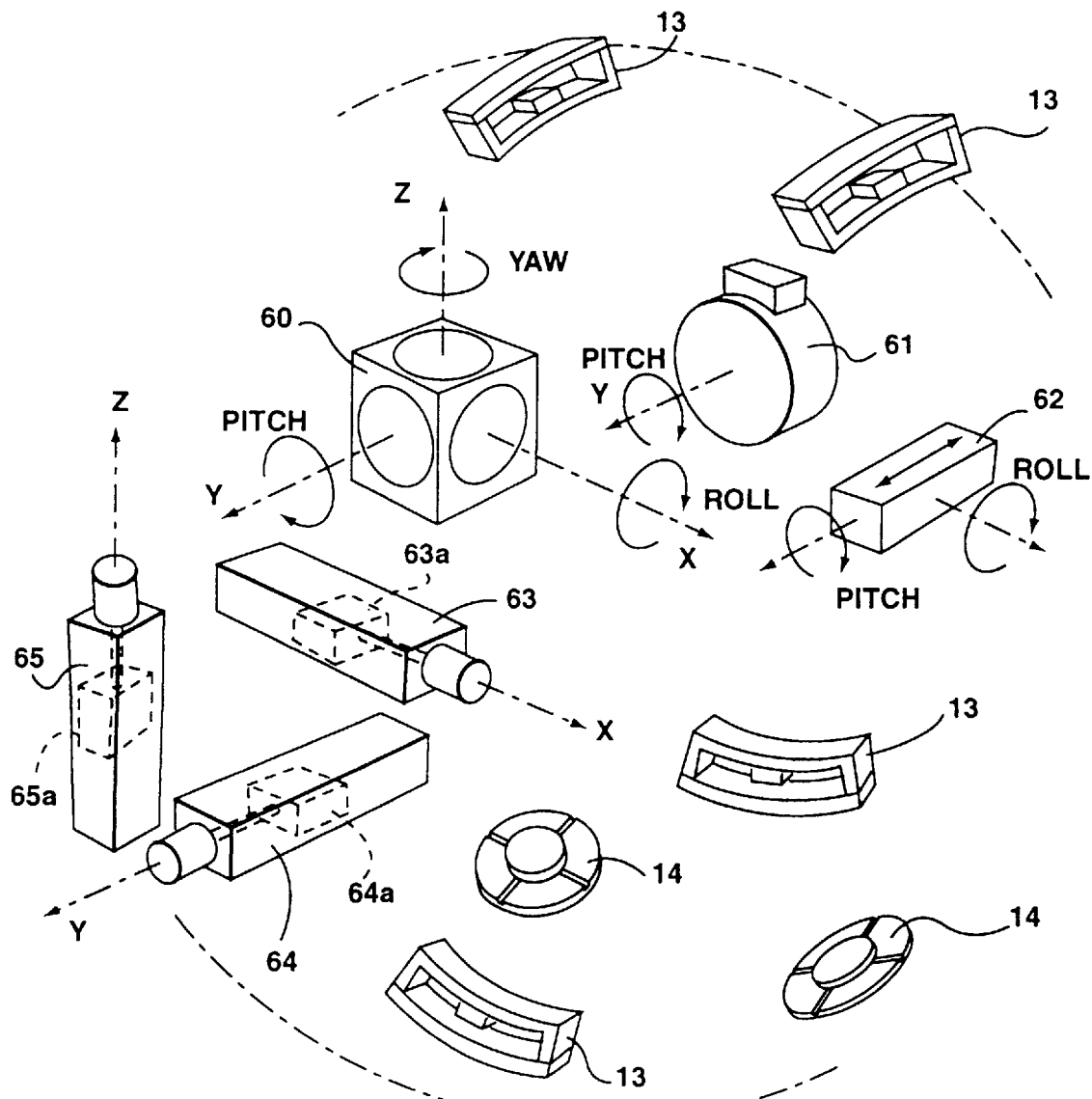
FIG. 5 shows the arrangement of sensors and actuators on the payload platform.

FIG. 5 shows the arrangement of sensors and actuators on the payload platform of the inner gimbal 1. The payload platform structure supporting these sensors and actuators is not shown for the sake of clarity. The location of these items on the payload platform may vary with the configuration of the payload, but their relative angular orientation remains the same. These sensors and actuators are part of the control system described later with reference to FIGS. 7a and 7b. Items 13, 14 are respectively the magnetic torque motor array and the capacitive sensor array described earlier. An array of three fiber optic gyros (FOGs) 60 with their sensing axis oriented orthogonally and identified in the figure as the x, y and z axes rotate about these axes identified as roll, pitch and yaw respectively. The sensor lines-of-sight are boresighted to the x (roll) axis.

Each FOG 60 outputs a digitized signal corresponding to the rate of rotation about its sensing axis relative to the inertial coordinates. An inclinometer 61 with a digital output is used to detect the vertical relative to the y axis. The inclinometer 61 is capable of indicating the vertical for any pitch angle. Alternatively, a pair of orthogonal linear accelerometers may be used instead of the inclinometer 61. In the latter case, the outputs of the two accelerometers must be resolved electronically to compute the pitch angle. A second inclinometer 62 or alternatively a linear accelerometer is used to detect the vertical relative to the x axis. The inclinometer 62 is capable of indicating the roll angle over a range of plus or minus 45 degrees or more independently of the pitch angle. Identical servo actuators 63, 64, 65 are each capable of precisely positioning a moving weight 63a, 64a, 65a respectively along its axis. The three actuators 63, 64, 65 are each oriented with their axis parallel to the X, Y and Z axes respectively.

Figure 6:
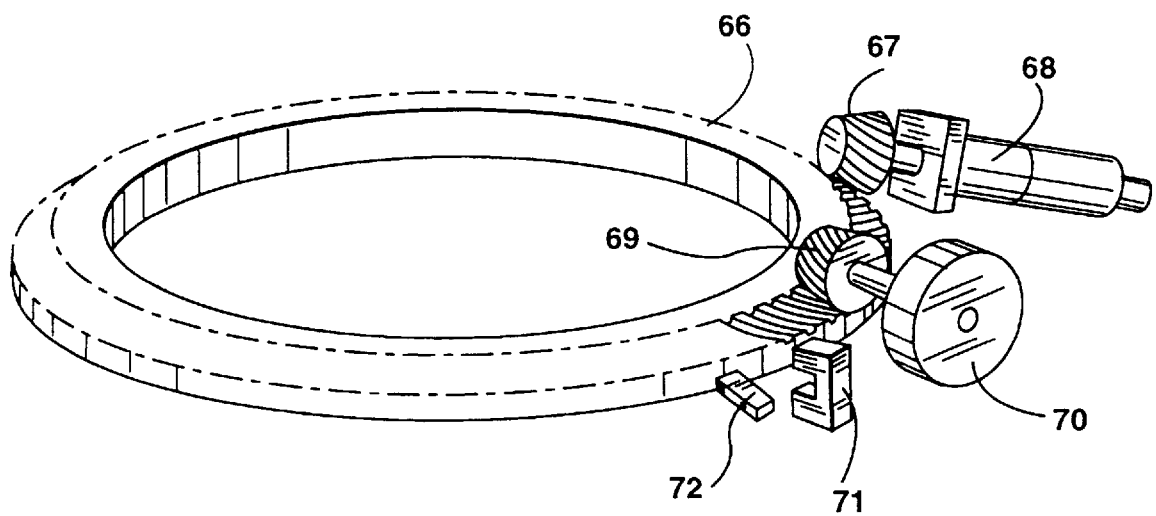
FIG. 6 shows the arrangement of an outer axis drive.

FIG. 6 shows a typical arrangement of an outer axis drive. Each of the outer axes, namely elevation, horizon if applicable, and azimuth, is provided with such a drive. Each of these axes is supported by a single ball bearing or a pair of ball bearings (not shown). A ring bevel gear 66 is attached to the moving or driven half of each axis drive. The ring gear 66 is driven by a bevel gear pinion 67 which in turn is driven by an electric motor and gear-head 68. An anti-backlash bevel gear 69 drives an incremental shaft encoder 70 which is used to precisely measure the angle of movement of the axis. This type of incremental shaft encoder is capable of measuring only relative angle, not absolute angle. To measure absolute angle, these devices output a narrow indexing pulse once per revolution of the encoder shaft.

If it is desired to measure the absolute angle of rotation of the large ring gear, a problem arises due to the multiplicity of index pulses per revolution due to the gearing. A photo-interrupter or slotted optical switch 71 is mounted on the fixed part of the drive, and a flag 72 is attached to the rotating part. The encoder 70 is aligned so that one of the indexing pulses occurs simultaneously with the actuation of the slotted switch 71 by the moving flag 72. The two signals are logically combined in an AND gate which gates out all but one indexing pulse of the many. For the actuation of the slotted switch and the occurrence of the indexing pulse to remain simultaneous, the reduction gear ratio between gates 66 and 69 must be an integral number.

Figure 7A:
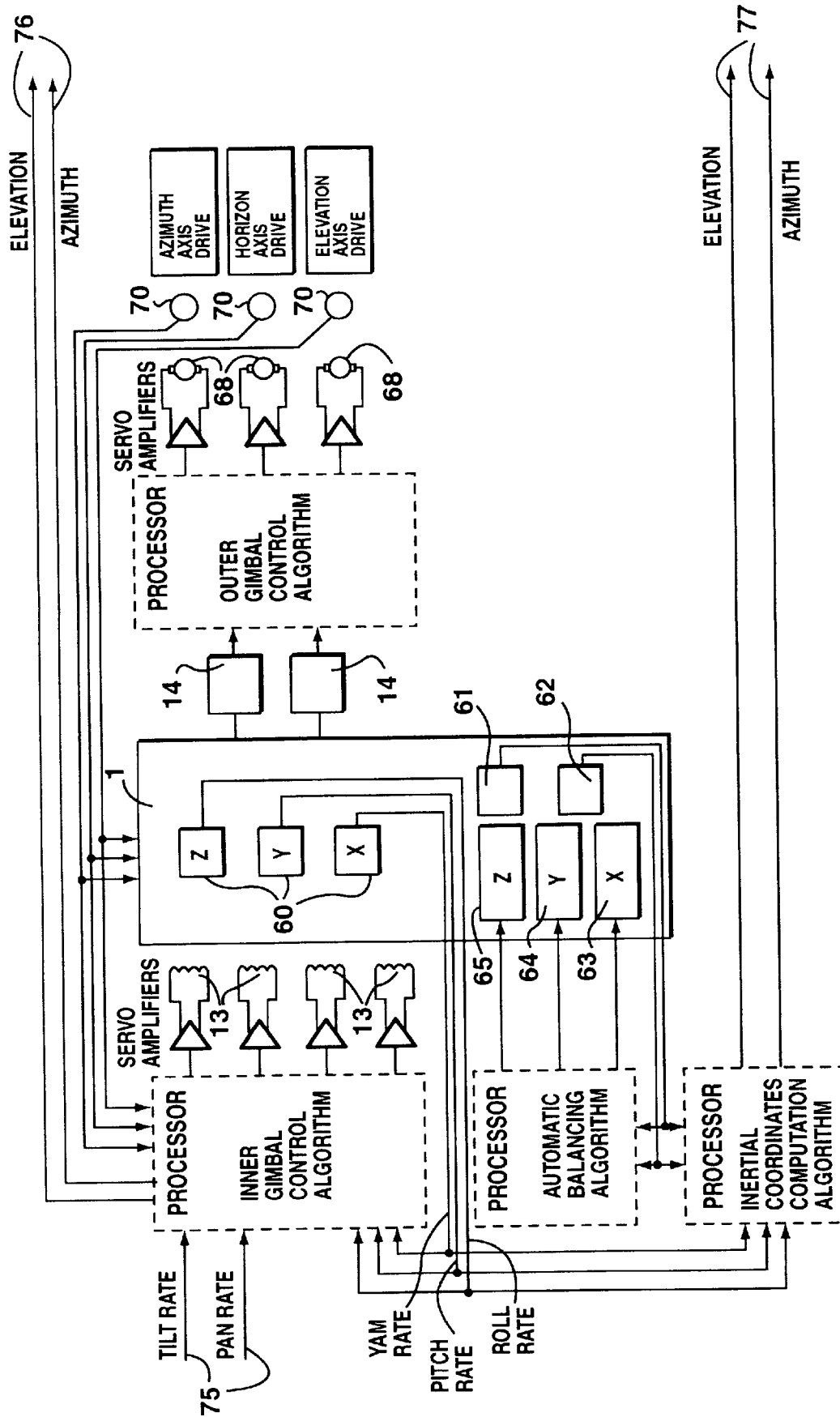
FIG. 7a is a block diagram of the control system of a platform system with three outer axes.

FIG. 7a is a block diagram of the control system of the embodiment of the invention having three outer axes as described in FIG. 1a. The control system is based on a single microprocessor. The primary control algorithms of this microprocessor are shown as separate blocks in the figure. The FOG array 60 attached to the inner gimbal 1 detects rates of rotation thereof relative to inertial coordinates. In the absence of external steering commands 75 (i.e. zero rates), the processor's inner gimbal control algorithm computes and causes the torque motor array 13 to apply small correction moments to the inner gimbal using the principle of negative feedback to maintain the angular orientation of the inner gimbal in space. Capacitive angle sensors 14 sense the angular displacement between the outer gimbal 3 and the inner gimbal 1 about three orthogonal axes. The processor's outer gimbal control algorithm resolves the three angular displacements into components aligned with the axes of the elevation, horizon and azimuth drives using the shaft encoders 70 to determine the current orientation of these axes. The resolved angular displacements are then used to drive the actuators on these axes to null each of the three angular displacements of the capacitive sensors 14, i.e. to continually centre these sensors, in effect causing the outer gimbal 3 to follow orientation of the inner gimbal 1.

In the presence of external steering signals 75, these two signals are resolved into three angular velocity vector components aligned with the FOG sensing axes X, Y and Z, using both the angles indicated by the shaft encoders 70 and the capacitive angle sensor array to determine the current orientation of the inner gimbal 1. The three negative feedback control loops then drive the inner gimbal 1 to follow the external rate steering signals. The outer gimbal control algorithm causes the outer gimbal 3 to follow the moving inner gimbal 1 as before.

The inner gimbal control algorithm also computes the elevation and azimuth angles 76 of the X axis of the inner gimbal 1, i.e. the line-of-sight of the bore-sighted sensors, relative to the support structure using both the angles indicated by the shaft encoders 70 and by the capacitive angle sensors 14 and transmits this information serially to the user. In the presence of vibration transmitted to the gimbals through the mounting interface, it is important to precisely statically balance the inner gimbal 1 above the central pivot 11, so that these vibrations do not apply dynamic moments to rotate the inner gimbal 1. The automatic balancing algorithm of the processor computes the long term control moments applied by the torque motor array required to maintain the inner gimbal 1 stationary in space and repositions the weights 63a, 64a, 65a in the three actuators 63, 64, 65 respectively in order to null or minimize such long term moments.

While the orientation of the inner gimbal 1 is maintained stationary in space, the earth rotates at the rate of 15 degrees per hour, causing the image of the horizon in the sensor array to apparently rotate at this rate. The pitch and roll inclinometers 61 and 62 on the inner gimbal 1 are used to generate automatic rate steering signals to steer the inner gimbal 1 to maintain a level horizon in the images.

The inertial coordinates computation algorithm of the processor uses the angular rate information from the FOGs 60 to compute attitude and heading of the line-of-sight in the form of Euler angles, as is commonly done in inertial navigation systems, and transmits this angle information 77 serially to the user in the form of an elevation angle relative to the vertical and an azimuth angle relative to inertial coordinates.

Figure 7B:
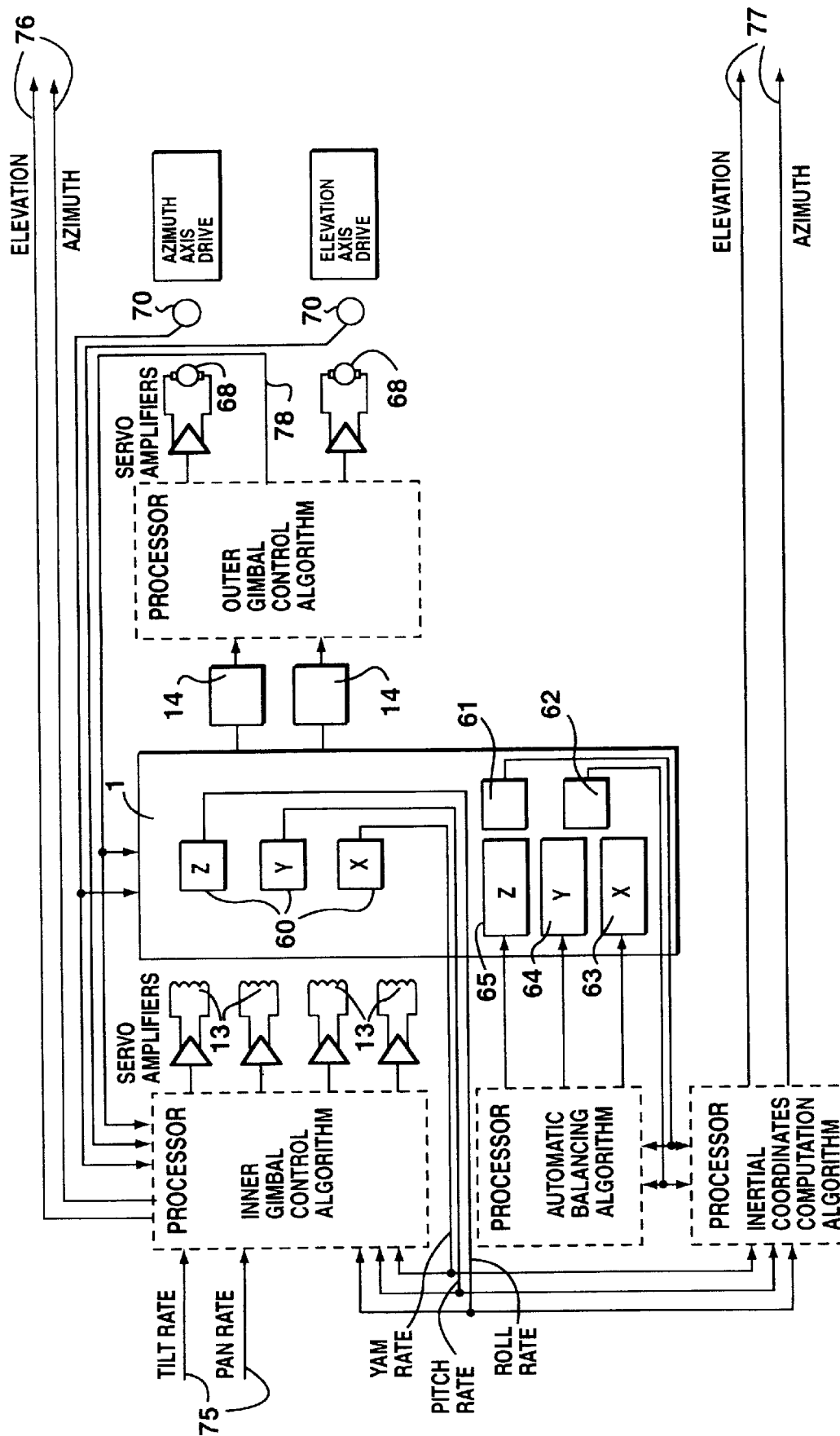
FIG. 7b is a block diagram of the control system of a platform system with two outer axes.

FIG. 7b is a block diagram of the control system of the embodiment of the invention having two outer axes as described in FIG. 1b. The operation of the control system is identical to that described in FIG. 7a except that the horizon axis drive is absent. The control signal normally generated to drive this axis 78 is not fed back to the inner gimbal control algorithm and is used to steer the inner gimbal about its X (roll) axis so as to null the roll component of the capacitive angle sensor array using negative feedback. This will cause the inner gimbal 1 to follow relatively slow attitude changes of the support structure about its X (roll) axis, but not follow the relatively rapid attitude changes which would cause deterioration of image quality. This will cause the imaged horizon to follow attitude changes of the support structure. The roll and pitch inclinometers 61, 62 are no longer used to maintain a level horizon, but are still used to compute the Euler angles.

FIGS. 8a and 8b show a sprung shell 102 in accordance with a further embodiment of the invention and which has a pair of shell disks 102a, 102b on opposite sides of a main shell body portion 102c, the shell disks 102a, 102b being integrally connected to the main body portion 102c only at a radially inner location 103. The springs 45 are connected to the shell disks 102a, 102b at a radially outer location.

The shell disks 102a, 102b are relatively thin and can flex resiliently in response to forces exerted by the springs 45 and can be considered to be extensions of the spring arrays. Such flexing can therefore be tolerated. The main body portion 102c is thus not subjected to such spring forces which might otherwise cause flexing of the main shell body portion 102c in such a manner as to adversely affect the accuracy of the magnetic torque motors 13 and capacitive angle sensors 14.

Thus, a stabilized platform system in accordance with preferred embodiments of the invention has an inner payload structure stabilized about three angular axes, but having minimal angular freedom while being supported by an outer structure with either three or two axes with inherently unlimited angular freedom. The inner payload structure is supported by a central universal joint of minimal size and unencumbered by torque motors or angle transducers. Instead, an array of magnetic torque motors of a unique design, which does not require constraint to individual axes of the universal joint, is used. Specifically, each magnetic torque motor of the array has an active direction along which a force can be applied but is unconstrained, i.e. free to move, about two or other axes of rotation. An array of three or more such motors is oriented that, when the motors of the array are energized in concert, controlled moments can be applied about any axis of rotation. The array is located at the periphery of the payload structure so that maximum control moments can be generated with a minimum of force. An array of angle transducers, also not constrained to a single axis of rotation and also located at the periphery of the payload structure, is used to measure the angles of rotation of the payload structure relative to the outer structure. Such an arrangement of angle transducers provides maximum angular resolution for a minimum of linear travel. An all-attitude passive vibration isolator which rotates with the inner payload structure is used, minimizing the amount of relief required to clear the supporting structure. A unique mechanism is incorporated in the passive isolator which automatically compensates for the static displacement of the isolator to minimize the clearance between the inner and outer structures.

Stability and controlled remote steering are achieved without using mechanical gyroscopes which tend to be heavy, complex and of limited reliability. They also have limited bandwidth and dynamic range, which tend to limit their effectiveness in closed loop, negative feedback control systems. Such limitations result in limitations in the degree of platform stability achievable. Instead, in accordance with the present invention, Fiber Optic Gyro (FOG) sensors are used. These are based on a relativistic effect rather than on the inertial effect of a rotating or oscillating mass. An array of inclinometers or accelerometers on the payload structure may be used to compensate for the earth's rate of rotation and to maintain a vertical reference. An array of servo-positioned weights on the payload structure is used to automatically establish and maintain neutral static balance of the structure about the central pivot.

The arrangement and sequence of the outer axis drives are such that the manoeuvrability of the vehicle with an imaging device supported in accordance with the present invention is not overly restricted. In an embodiment of the invention having three outer axes, the arrangements of outer axes results in the ability to fully control the direction of the line-of-sight, including the ability to track targets overflown, as well as the ability to automatically retain a level image of the horizon. In an embodiment of the invention having two outer axes, the arrangement of outer axes and the method of control of the inner axes result in the ability to filter out small rapid attitude changes of the vehicle about the roll axis of bore-sighted images and preserve the quality of the image, and to follow larger, slower attitude changes of the vehicle without overly restricting its manoeuvrability.

The present invention provides the ability to measure the angle of bore-sighted sensor lines-of-sight relative to the moving supporting structure or vehicle and to continually transmit this information to the user in a digitized form. The invention also provides the ability to compute the angles of the bore-sighted lines-of-sight relative to the vertical and to an inertial azimuth reference and to also continually transmit this information to the user in a digitized form.

Other embodiments of the invention will be readily apparent to a person skilled in the art, the scope of the invention being defined in the appended claims.

We claim:

1. A stabilized platform system for isolating a payload from angular motion and translational and angular vibration of a supporting structure, said platform system having:
   an inner gimbal for carrying the payload,
   a sprung shell containing and carrying the inner gimbal in a manner permitting the inner gimbal a limited amount of angular movement relative thereto about pitch, roll and yaw axes,
   an outer gimbal containing the sprung shell and inner gimbal, and
   a passive vibration isolator connected between the sprung shell and the outer gimbal and having two symmetrical arrays of dampened coil springs located on opposite sides of the sprung shell.

2. A stabilized platform system according to claim 1 including an array of at least three magnetic torque motors, each motor having an electrically energizable coil portion carried by the sprung shell and a magnetic structure portion carried by the inner gimbal, each magnetic torque motor having an active axis along which an inner gimbal positioning force can be applied but having freedom of movement about the other two axes, and a controller for controlling energization of the motors to apply controlled moments to the inner gimbal about any axis of rotation.

3. A stabilized platform according to claim 1 having at least one capacitive angle sensor having a first portion carried by the sprung shell and a second portion carried by the inner gimbal with an air gap between said first and second portions, said capacitive angle sensor being responsive to relative motion between the first and second portions to provide a signal indicative of the angular position of the inner gimbal relative to the sprung shell.

4. A stabilized platform system according to claim 1 wherein each array of dampened coil springs of the passive vibration isolator extends completely around the sprung shell on the respective side thereof to provide compliance in three orthogonal directions.

5. A stabilized platform system according to claim 1 also including eccentric mechanism connecting the passive vibration isolator to the outer gimbal and responsive to angular movement of the outer gimbal to position the sprung shell at an optimum location in the outer gimbal by correcting static displacement of the isolator.

6. A stabilized platform system according to claim 1 wherein the inner gimbal carries at least one fiber optic gyro operable to provide a signal of angular movement of the inner gimbal about a pre-determined axis.

7. A stabilized platform system according to claim 1 also including a first mounting member carrying the outer gimbal, said outer gimbal being angularly adjustable relative to the first mounting member about an elevation axis.

8. A stabilized platform system according to claim 7 also including a second mounting member carrying the first mounting member, the first mounting member being angularly adjustable relative to the second mounting member about a horizontal axis perpendicular to the elevation axis.

9. A stabilized platform system according to claim 8 wherein the second mounting member is itself angularly adjustable about a vertical axis.

10. A stabilized platform system according to claim 1 also including a mounting member carrying the outer gimbal, the outer gimbal being angularly adjustable relative to the mounting member about an elevation axis, said mounting member itself being angularly adjustable about a vertical axis.

11. A stabilized platform system according to claim 1 wherein the sprung shell has a main body portion and a pair of shell disks on opposite sides thereof connected to the main body portion only at a radially inner location, and said coil springs are connected to the shell disks at a radially outer location.

* * * * *